United States Patent
Chaudhari et al.

(10) Patent No.: US 9,883,183 B2
(45) Date of Patent: Jan. 30, 2018

(54) DETERMINING NEIGHBORHOOD VIDEO ATTRIBUTE VALUES FOR VIDEO DATA

(71) Applicant: QUALCOMM Incorporated, San Diego, CA (US)

(72) Inventors: Gaurang Chaudhari, Santa Clara, CA (US); Atul Garg, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 14/949,661

(22) Filed: Nov. 23, 2015

(65) Prior Publication Data

US 2017/0150144 A1 May 25, 2017

(51) Int. Cl.

| | |
|---|---|
| H04N 19/115 | (2014.01) |
| H04N 19/172 | (2014.01) |
| H04N 19/176 | (2014.01) |
| H04N 19/527 | (2014.01) |
| H04N 19/129 | (2014.01) |
| H04N 19/80 | (2014.01) |
| H04N 19/42 | (2014.01) |
| H04N 19/426 | (2014.01) |
| H04N 19/59 | (2014.01) |

(52) U.S. Cl.
CPC ......... *H04N 19/115* (2014.11); *H04N 19/129* (2014.11); *H04N 19/172* (2014.11); *H04N 19/176* (2014.11); *H04N 19/42* (2014.11); *H04N 19/426* (2014.11); *H04N 19/527* (2014.11); *H04N 19/59* (2014.11); *H04N 19/80* (2014.11)

(58) Field of Classification Search
CPC .. H04N 19/115; H04N 19/129; H04N 19/172; H04N 19/176; H04N 19/42; H04N 19/426; H04N 19/527; H04N 19/59; H04N 19/80
See application file for complete search history.

(56) References Cited

U.S. PATENT DOCUMENTS

| | | | |
|---|---|---|---|
| 7,715,480 B2* | 5/2010 | Wang | ..................... H04N 19/63 375/240.19 |
| 7,720,311 B1 | 5/2010 | Sriram | |
| 8,139,101 B2 | 3/2012 | Bjontegaard et al. | |
| 8,654,835 B2* | 2/2014 | Li | ........................ H04N 19/105 375/240.01 |

(Continued)

OTHER PUBLICATIONS

Andraka R., "A Dynamic Hardware Video Processing Platform," 1996, 10 pages.

(Continued)

*Primary Examiner* — Shan E Elahi

(57) ABSTRACT

A method and apparatus for determining neighborhood video attribute values for a frame of video data are disclosed. In one aspect, the method includes receiving coordinates for a current block location and a previous block location of the frame and generating a vector indicative of the displacement of the current block from the previous block via comparing the coordinates of the current block location to the coordinates of the previous block location. The method may also include updating the neighborhood video attribute values based at least in part on the generated vector and processing the frame based on the updated neighborhood video attribute values.

30 Claims, 11 Drawing Sheets

(56) References Cited

U.S. PATENT DOCUMENTS

| | | | | |
|---|---|---|---|---|
| 8,964,852 B2* | 2/2015 | Chong | ............... | H04N 7/26255 375/240.02 |
| 8,989,261 B2* | 3/2015 | Chong | ............... | H04N 7/26255 375/240.02 |
| 2005/0047503 A1* | 3/2005 | Han | ............... | H04N 19/619 375/240.01 |
| 2005/0084014 A1* | 4/2005 | Wang | ............... | H04N 19/63 375/240.19 |
| 2006/0008006 A1* | 1/2006 | Cha | ............... | H04N 19/176 375/240.16 |
| 2006/0013310 A1* | 1/2006 | Lee | ............... | H04N 19/159 375/240.16 |
| 2006/0104363 A1 | 5/2006 | Chang et al. | | |
| 2010/0053181 A1 | 3/2010 | Schlanger et al. | | |
| 2010/0316129 A1 | 12/2010 | Zhao et al. | | |
| 2011/0170591 A1* | 7/2011 | Li | ............... | H04N 19/105 375/240.01 |
| 2012/0044986 A1* | 2/2012 | Chong | ............... | H04N 19/46 375/240.02 |
| 2012/0044992 A1* | 2/2012 | Chong | ............... | H04N 19/46 375/240.12 |
| 2012/0051425 A1* | 3/2012 | Chong | ............... | H04N 19/176 375/240.12 |
| 2012/0051438 A1* | 3/2012 | Chong | ............... | H04N 19/176 375/240.25 |
| 2012/0213271 A1* | 8/2012 | Chong | ............... | H04N 7/26255 375/240.02 |
| 2012/0213292 A1* | 8/2012 | Chong | ............... | H04N 7/26255 375/240.24 |
| 2013/0094592 A1* | 4/2013 | Zhou | ............... | H04N 19/00 375/240.25 |
| 2013/0329784 A1 | 12/2013 | Chuang et al. | | |
| 2014/0321755 A1 | 10/2014 | Iwamoto et al. | | |
| 2015/0264404 A1* | 9/2015 | Hannuksela | ............... | H04N 19/70 375/240.16 |
| 2015/0341638 A1* | 11/2015 | Francois | ............... | H04N 19/11 375/240.12 |
| 2016/0014411 A1* | 1/2016 | Sychev | ............... | H04N 19/56 375/240.12 |
| 2017/0070735 A1* | 3/2017 | Ramasubramonian | | H04N 19/124 |

OTHER PUBLICATIONS

Zhang Y-F., et al., "Shrinkability Maps for Content-Aware Video Resizing," Pacific Graphics, Igarashi T., et al., Ed., 2008, vol. 27 (7), pp. 1797-1804.

Bao Y., et al., "Design of Wavelet-Based Image Codec in Memory-Constrained Environment", IEEE Transactions on Circuits and Systems for Video Technology, IEEE Service Center, Piscataway, NJ, US, May 1, 2001 (May 1, 2001), XP011014194, vol. 11, No. 5, pp. 642-650.

International Search Report and Written Opinion—PCT/US2016/057373—ISA/EPO—dated Jan. 4, 2017.

* cited by examiner

DETERMINING NEIGHBORHOOD VIDEO ATTRIBUTE VALUES FOR VIDEO DATA

TECHNICAL FIELD

This disclosure relates to the field of video processing, and particularly to determining neighborhood video attribute values for video processing.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), High Efficiency Video Coding (HEVC), VC-1, VP8, VP9, and extension(s) of such standards. The video devices may transmit, receive, encode, decode, and/or store digital video information more efficiently by implementing such video coding techniques.

Various video processing techniques use the walk order (also referred to as raster order, arrival order, or scan order) of a video frame in order to determine neighborhood attribute values that may be used in the processing techniques. Since the determined neighborhood attribute values may be dependent upon the walk order of the video frame under processing, the required control logic for determining the neighborhood attribute values must be customized for each walk order. Accordingly, traditional implementations of the control logic are limited to the walk orders for which they are designed.

SUMMARY

The systems, methods and devices of this disclosure each have several innovative aspects, no single one of which is solely responsible for the desirable attributes disclosed herein.

In one aspect, a method operable by a video coding circuit for determining neighborhood video attribute values for a frame of video data comprises receiving coordinates for a current block location and a previous block location of the frame; generating a vector indicative of the displacement of the current block from the previous block via comparing the coordinates of the current block location to the coordinates of the previous block location; updating the neighborhood video attribute values based at least in part on the generated vector; and processing the frame based on the updated neighborhood video attribute values.

In another aspect, a device for determining neighborhood video attribute values for a frame of video data comprises a memory configured to store the video data; and a processor in communication with the memory and configured to: receive coordinates for a current block location and a previous block location of the frame; generate a vector indicative of the displacement of the current block from the previous block via comparing the coordinates of the current block location to the coordinates of the previous block location; update the neighborhood video attribute values based at least in part on the generated vector; and process the frame based on the updated neighborhood video attribute values.

In another aspect, an apparatus comprises means for receiving coordinates for a current block location and a previous block location of a frame of video data; means for generating a vector indicative of the displacement of the current block from the previous block via comparing the coordinates of the current block location to the coordinates of the previous block location; means for updating neighborhood video attribute values for the frame based at least in part on the generated vector; and means for processing the frame based on the updated neighborhood video attribute values.

In another aspect, a non-transitory computer readable storage medium has stored thereon instructions that, when executed, cause a processor of a device to receive coordinates for a current block location and a previous block location of the frame; generate a vector indicative of the displacement of the current block from the previous block via comparing the coordinates of the current block location to the coordinates of the previous block location; update the neighborhood video attribute values based at least in part on the generated vector; and process the frame based on the updated neighborhood video attribute values.

DETAILED DESCRIPTION

Figure 1A:
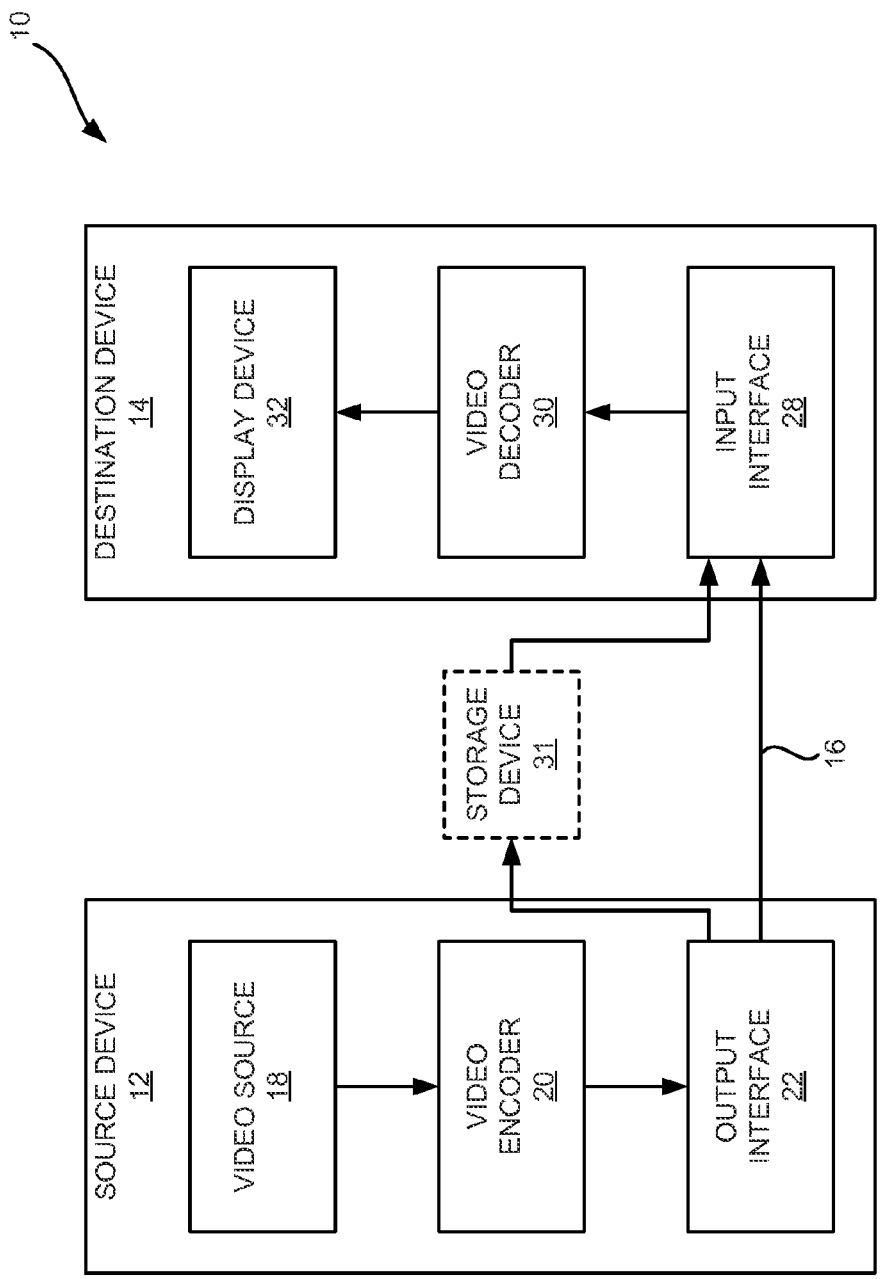
FIG. 1A is a block diagram illustrating an example video encoding and decoding system that may utilize techniques in accordance with aspects described in this disclosure.

In existing approaches for determining neighborhood video attribute values for video processing, the determination of the neighborhood video attribute values is dependent upon the walk order of the current video frame undergoing processing. Accordingly, the control logic which determines the neighborhood video attribute values is customized for each walk order, thereby limiting the number of walk orders that can be processed. Furthermore, certain codecs may not have a static walk order (i.e., the walk order may be variable), requiring the control logic be programmed with the conditions for determining the variable walk order.

One method for addressing this issue includes designing customized control logic for each walk order to be processed by the control logic. Codecs may employ a variety of different walk orders, and thus the hardware requirements for the control logic (such as the logic area in which the control logic is placed) increase as the number of codecs that can be processed by the control logic increases. Another method for addressing this issue is to store the entire video frame in a frame buffer and process the stored frame using a walk order that is independent of the codec's walk order. The use of a frame buffer limits the ability of the control logic to process video frames that are larger than the frame buffer size and this method is expensive in terms of the hardware requirements for including the frame buffer.

This disclosure addresses the above limitations by providing a processing method having reduced hardware requirements and having the flexibility to process video frames regardless of the walk order used by the codec.

In the description below, H.264/Advanced Video Coding (AVC) techniques related to certain embodiments are described; the High Efficiency Video Coding (HEVC) standard and related techniques are also discussed. While certain embodiments are described herein in the context of the HEVC and/or H.264 standards, one having ordinary skill in the art would appreciate that systems and methods disclosed herein may be applicable to any suitable video coding standard and/or to any video processing method. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the range extension.

HEVC generally follows the framework of previous video coding standards in many respects. The unit of prediction in RENT is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/EEC MPEG-2 ITU-T H.263, ISO/IEC MPEG-4 Visual and ITU-T H.264 (also known as ISO/IEC AVC), and HEVC including the range extension.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The range extension to HEVC is also being developed by the JCT-VC.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
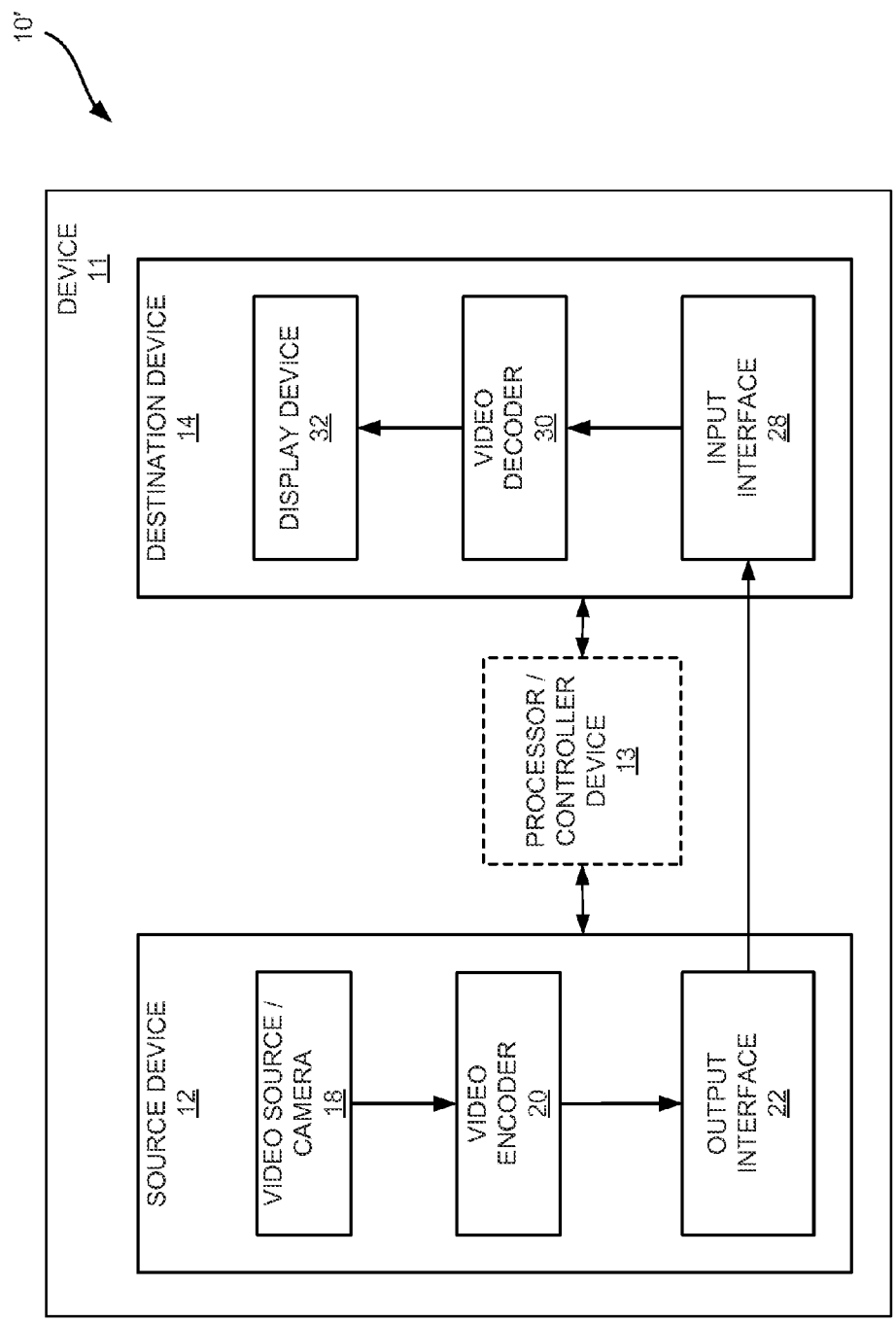
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication. For example, the source device 12 and the destination device 14 may each comprise a wireless communication device comprising a memory, a processor and a receiver. In certain embodiments, the wireless communication device is a cellular telephone configured to receive video data by the receiver. The video data received by the receiver may be modulated according to a cellular communication standard.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as, for example, a hard drive, flash memory, volatile or non-volatile memory, or any other suitable digital storage media for storing encoded video data. In some implementations, the data storage or memory may store video data used in the method for determining neighborhood video attribute values for a frame of the video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. In certain implementations, the receiver of the input interface 28 may be configured to wirelessly receive video data including coordinates for a current block location and a previous block location of a frame of video data in order to determine neighborhood video attribute values for the frame of the video data. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3 or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUR units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be refilled to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the GU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, Supplemental Enhancement Information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2:
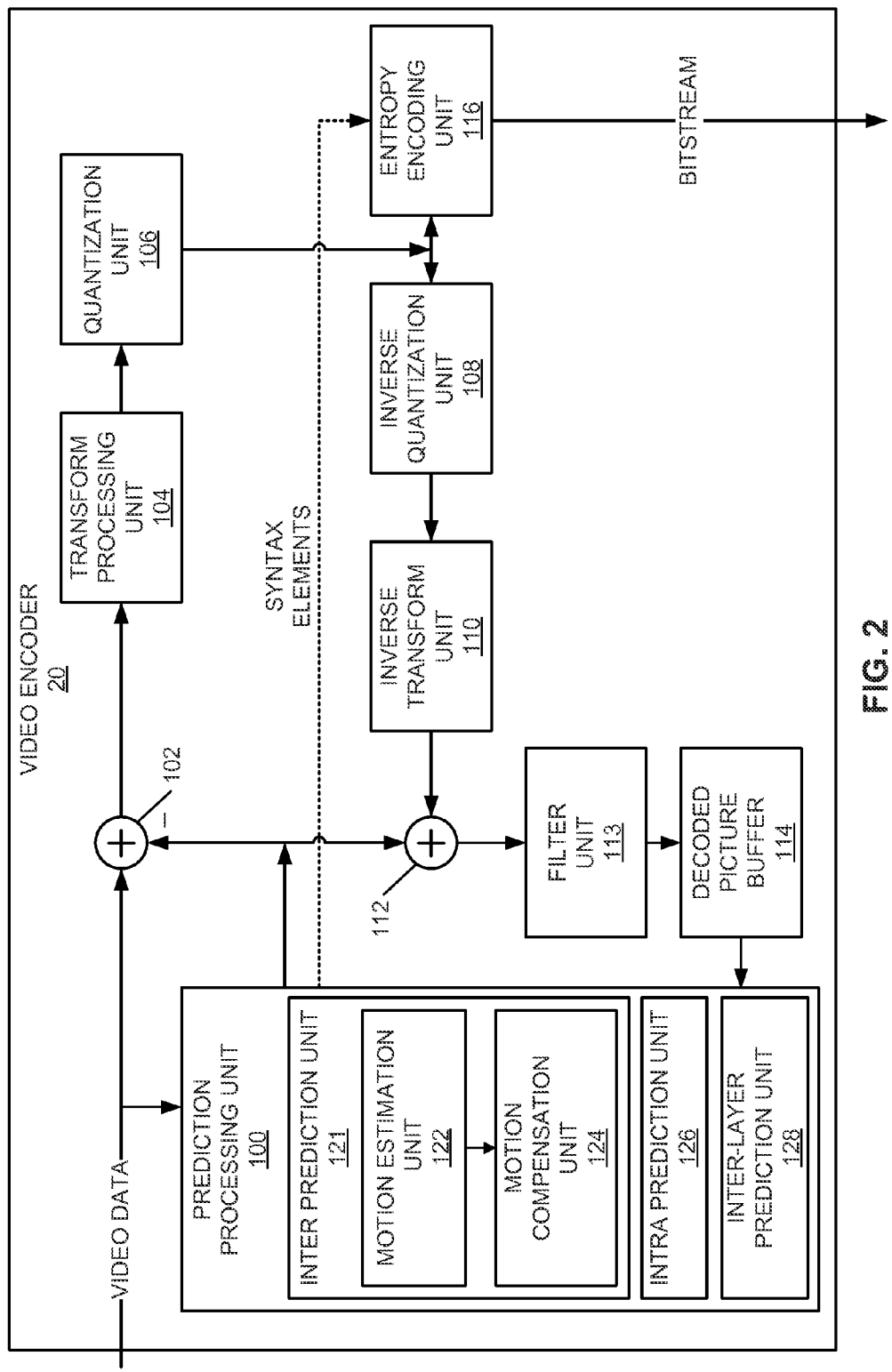
FIG. 2 is a block diagram illustrating an example of a video encoder that may implement techniques in accordance with aspects described in this disclosure.

FIG. 2 is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2 is for a single layer codec. However, in certain embodiments, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2 separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned. CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based on the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU intra prediction unit 126 may use multiple intra prediction modes to generate multiple sets of prediction data for the PU, When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in Scalable HVC (SHVC) (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 21) residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
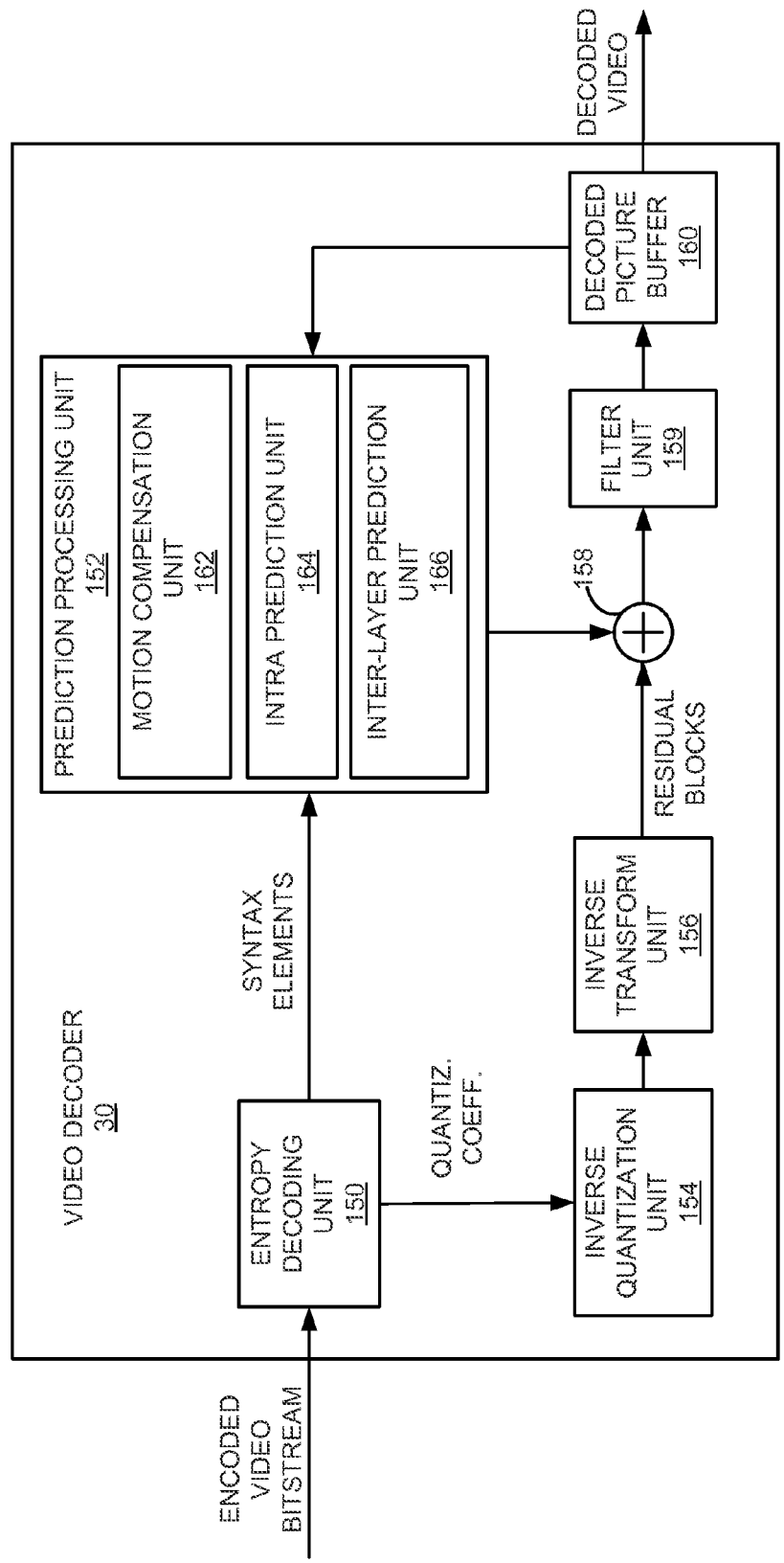
FIG. 3 is a block diagram illustrating an example of a video decoder that may implement techniques in accordance with aspects described in this disclosure.

FIG. 3 is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3 is for a single layer codec. However, in certain implementations, some or all of the video decoder 30 may be duplicated for processing of a multi-layer codec.

In the example of FIG. 3, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded. CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TV, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the infra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Video Processing Based on Walk Order

Hereinafter, the present disclosure will be described in connection with an exemplary implementation within a video downscaler. However, the present disclosure is not limited thereto and those skilled in the art will recognize that the present disclosure may be applied to any video processing techniques that employ processing decisions based on the walk order of the video.

Figure 4:
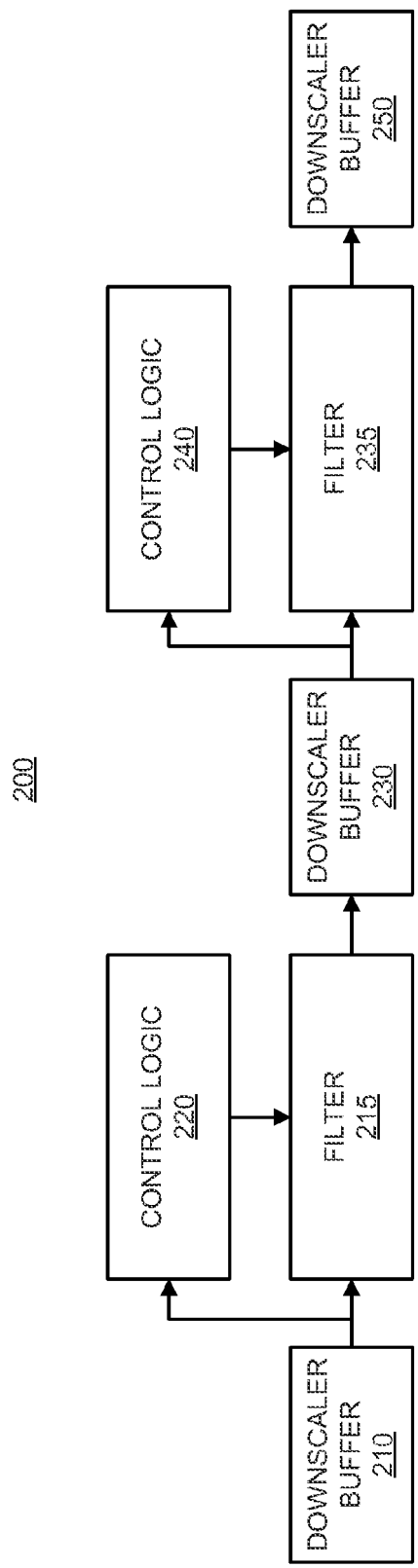
FIG. 4 is a block diagram illustrating a downscaler that may implement techniques in accordance with aspects described in this disclosure.

FIG. 4 is a block diagram illustrating a video downscaler (also referred to as a "downscaler") that may implement techniques in accordance with aspects described in this disclosure. The downscaler 200 of FIG. 4 includes three downscaler buffers 210, 230, and 250, control logic 220 and 240 and two filters 215 and 235.

Downscalers may be used to reduce the size of an input video frame by a given ratio or scale. Input video frames may be organized in a hierarchical manner where a frame is composed of tiles, the tiles are composed of LCUs, and the LCUs are composed of pixel blocks. Common block sizes may include, for example, 2×2, 4×4, 8×8, or 16×16 pixels. In the downscaler pipeline of FIG. 4, the input block(s) of pixels are received by the first downscaler buffer 210 entering the pipeline from left and scaled pixel block(s) exit from downscaler buffer 250 on the right hand side of the figure. The illustrated video pipeline processes one frame by processing the pixel blocks in the order of arrival.

Figure 5:
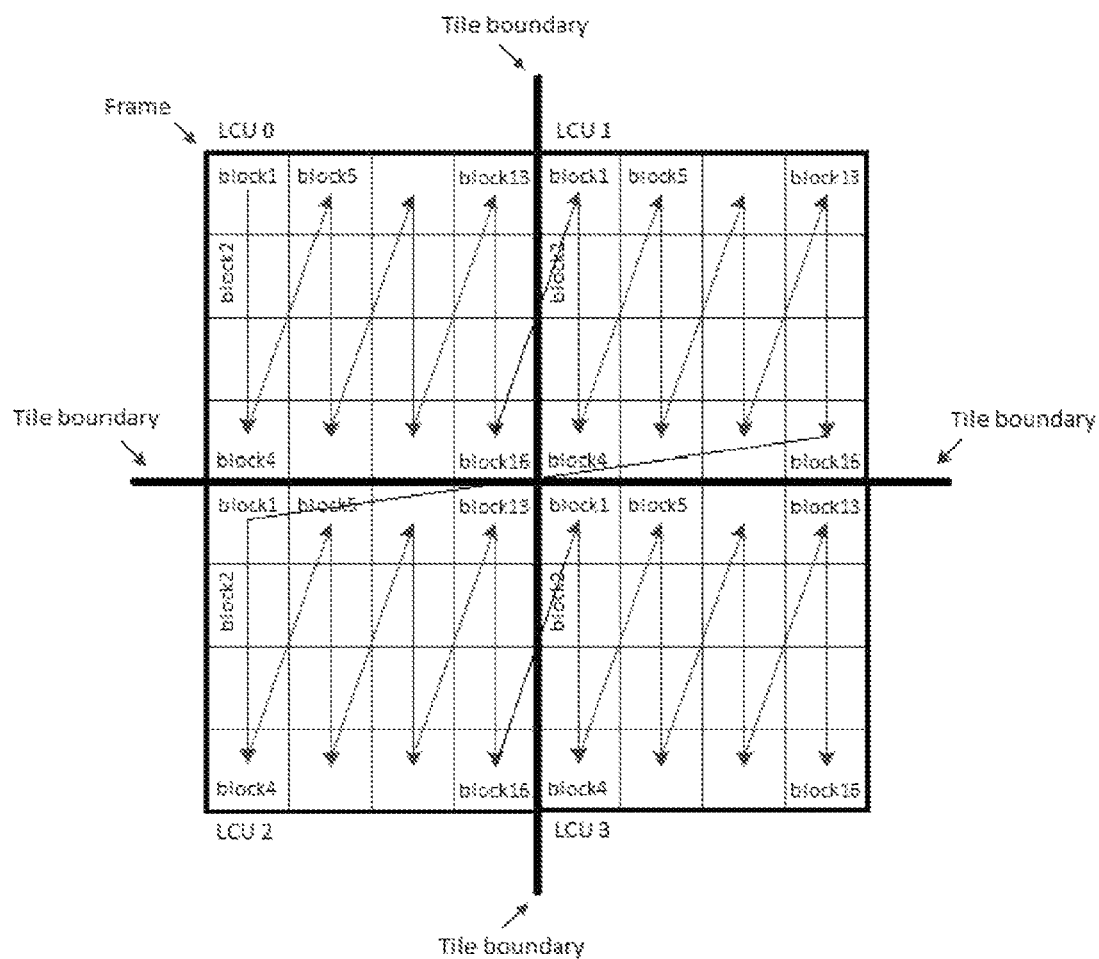
FIG. 5 is a diagram illustrating an exemplary walk order for a portion of a video frame.
Figure 6:
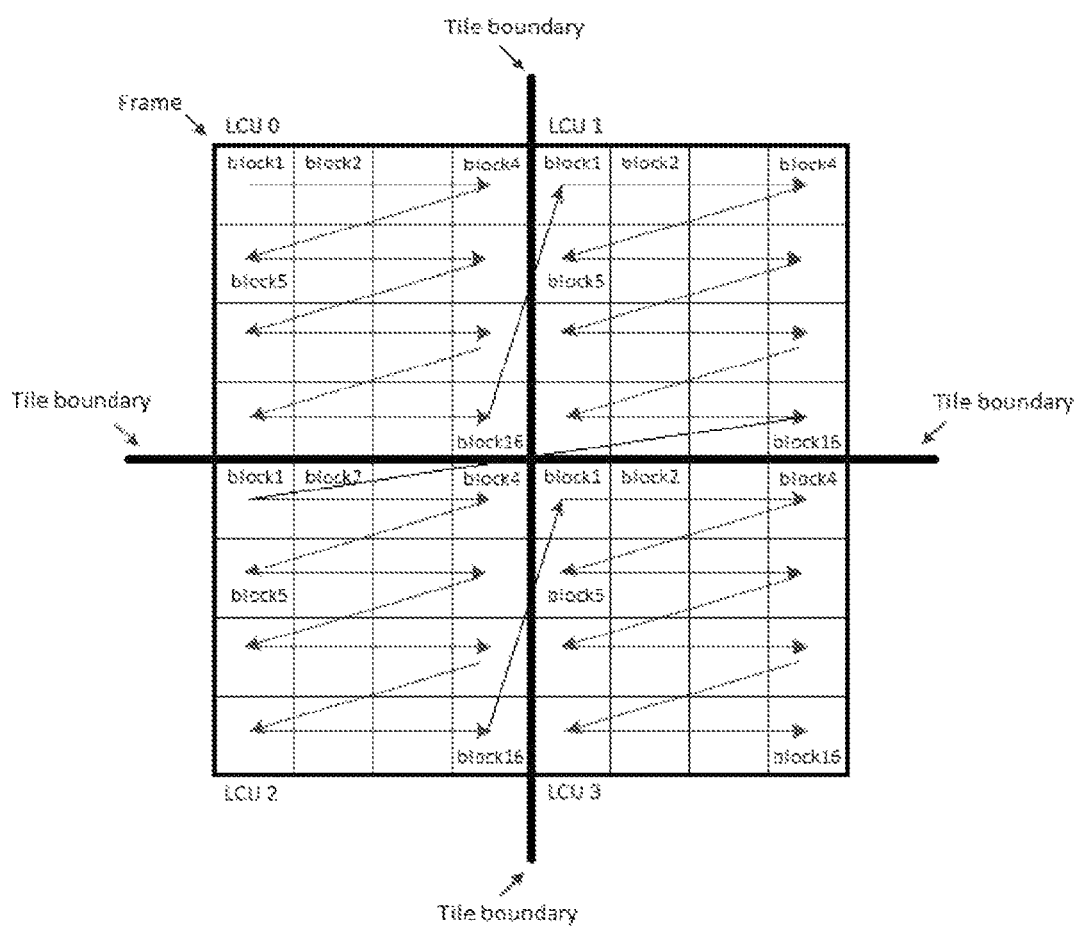
FIG. 6 is a diagram illustrating another exemplary walk order for a portion of a video frame.

FIG. 5 is a diagram illustrating an exemplary walk order for a portion of a video frame. FIG. 5 illustrates a walk order which scans in vertical lines from left to right. FIG. 6 is a diagram illustrating another exemplary walk order for a portion of a video frame. FIG. 6 illustrates a walk order which scans in horizontal lines from top to bottom. The example video frames 300 and 305 in FIGS. 5 and 6 include four LCUs LCU 0 through LCU 3 arranged along pair of tile boundaries. Each of the LUCs LCU 0 to LCU 3 includes 16 blocks block1 through block16. The arrows in FIG. 5 illustrate the walk order tier the blocks block1 to block16 of a given codec. In other codecs, the walk order may be completely different from the walk order illustrated in FIG. 5. For example, in the example of FIG. 6, the walk order traverses the blocks block1 to block16 in a different order than the FIG. 5 example. Although not illustrated, the order in which the walk order traverses the LCUs LCU 0 to LCU 3 may also be different for other codecs.

Returning to FIG. 4, the downscaler 200 receives an input block via the first downscaler buffer 210 and scales or filters the input block in horizontal direction via the first filter 215. The output from the first filter 215 is stored in the second downscaler buffer 230, which is subsequently filtered in vertical direction via the second filter 235 and then stored in the third downscaler buffer 250. During the processing of a block, the control logic modules 220 and 240 calculate and maintain information, such as neighborhood filter attributes (also referred to as neighborhood filter attribute values) for the block being filtered (i.e., the current block). The neighborhood filter attributes may include phase value(s), accumulator value(s), and residual divisor value(s). The control logic modules 220 and 240 may further update the neighborhood filter attributes as the processing continues based on the walk order of the video frame. This may create a problem for the processing of various types of codec inputs with the same control logic modules 220 and 240, since the control logic modules 220 and 240 will have to be customized for every codec and/or walk order. This in turn makes the module not usable for new codecs with slightly different walk orders or for any walk order that has not been previously considered.

In implementations where the present disclosure is not implemented within a video downscaler, the neighborhood filter attributes may be any neighborhood attribute values that are based on the walk order and used during the processing of a video frame. Further, although the implementation of FIG. 4 has been described as filtering in the horizontal direction first and then in the vertical direction, this ordering may be reversed depending on the implementation.

As previously discussed, one method of addressing the above-indicated problem is via implementing custom control logic (not illustrated) for every walk order. Since many codecs employ differing walk orders and implementing a custom control logic for every codec multiplies the implementation logic area (i.e., the required hardware footprint) normally required for a single codec by the number of codecs that can be processed by the downscaler 200.

Another method of addressing this problem is to store the entire frame at the input (i.e., before the first downscaler buffer 210) in a frame buffer (not illustrated). The video frame may then be processed independent of the walk order of the codec. The additional frame buffer at the input limits the ability of the downscaler 200 to process frame sizes that are larger than the size of the frame buffer and is also expensive in terms of the hardware footprint required for implementation.

Accordingly, aspects of the present disclosure relate to a downscaler having a reduced area and increased codec walk order flexibility. These aspects may be able to process any walk order without requiring a separate custom control logic or a frame storage buffer at the input. The control logic 220 and 240 in accordance with aspects of this disclosure can handle any walk order.

Figure 7:
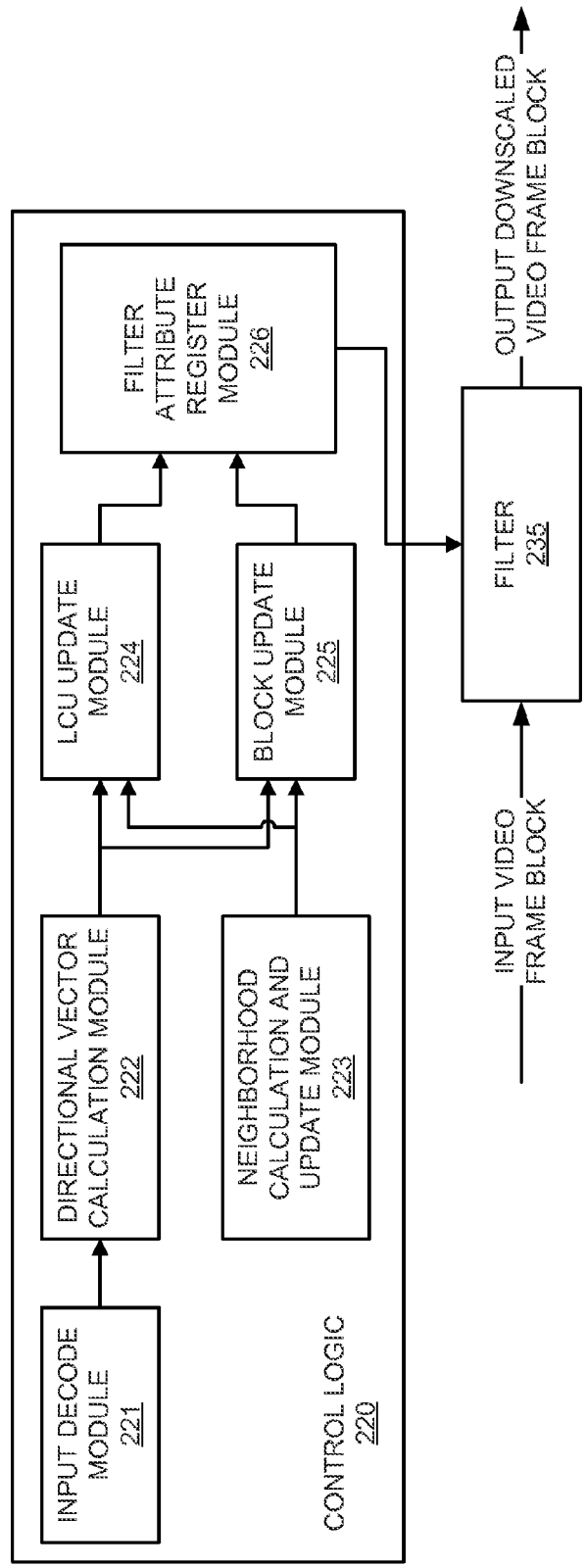
FIG. 7 is a block diagram illustrating control logic and a filter in accordance with aspects described in this disclosure.

FIG. 7 is a block diagram illustrating control logic and a filter in accordance with aspects described in this disclosure. The control logic 220 contains an input decode module 221, a directional vector calculation module 222, a neighborhood calculation and update module 223, an LCU update module 224, a block update module 225, and a filter attribute register module 226. The control logic 220 is also operably connected to the filter 235. The input pixels or information related to the input pixels arrives at the input decode module 221. The location coordinates of the input pixels is output from the input decode module 221 to the directional vector calculation module 222.

The directional vector calculation module 222 breaks down the walk order to create a vector indicative of the displacement of the walk order. For example, the vector may be indicative of the displacement of a current block from a previous block or the displacement of a current LCU from a previous LCU. In some implementations, the directional vector calculation module 222 transforms the walk order into two relative directional vectors: forward and backward vectors. Accordingly, any arbitrary walk order may be coded into these two directional vectors. These directional vectors are then used by the LCU update and block update modules 224 and 225 to update the filter attributes. The filter attributes are then supplied to the filter 235 as the neighborhood attributes. The neighborhood calculation and update module 223 outputs the filter attribute values associated with each block to the LCU update and block update modules 224 and 225.

This input decode module 221 takes the horizontal or vertical block stream and decodes the pixel location coordinates from the stream. The input decode module 221 then sends the pixel location information to the directional vector calculation module 222.

The directional vector calculation module 222 compares the current block location coordinates received from the input decode module 221 with the previous block coordinates received from the input decode module 221 and calculates the direction flags for the current block. In some implementations, the direction flags are calculated for both x and y direction and are based on the following conditions:

a. If the block is going forward then the forward flag is set for that block.
  b. If the block is going backward then the backward flag is set for that block.
  c. If there is no change in x or y coordinates, the corresponding flag values are reset (i.e., set to zero) in x or y direction.

In some implementations, the vectors are described using six flags. The flags may include: forward_x_lcu, backward_x_lcu, forward_y_lcu, backward_y_lcu, forward_x_block, forward_y_block. These flags are supplied to both the LCU update and the block update modules 224 and 225. However, in other implementations, a more or fewer flags may be used to describe the vectors. For example, the flags may also include: backward_x_block and backward_y_block flags.

The neighborhood calculation and update module 223 receives the filter attributes for the previous block and/or LCU from the filter attribute register module 226 and calculates the current value(s) of the different filter attributes (for example, phase value(s), accumulator value(s), residual divisor value(s), etc.) and provides the attributes as input to the LCU update and block update modules 224 and 225.

The filter attribute register module 226 includes local registers for the LCU update (registers A, B and C) and block update (registers D and E) modules 224 and 225. Each of these registers may define the correct values associated with each block since the video stream is hierarchical. In some implementations, register A stores the filter attribute value for a current tile, register B stores the filter attribute value for a current LCU, and register C stores the filter attribute value for a previous LCU. In these implementations, register D stores the filter attribute value for a current block and register E stores the filter attribute value for a previous block.

The LCU update module 224 receives the filter attribute values and the directional vector associated with each block. The LCU update module 224 then updates the tile and LCU related values, which may be stored in the corresponding registers A, B, and C of the filter attribute register module 226.

The block update module 225 receives the filter attribute values and the directional vector associated with each block. The block update module 225 then updates the block related values for the current block, which may be stored in the corresponding register D of the filter attribute register module 226.

Figure 8:
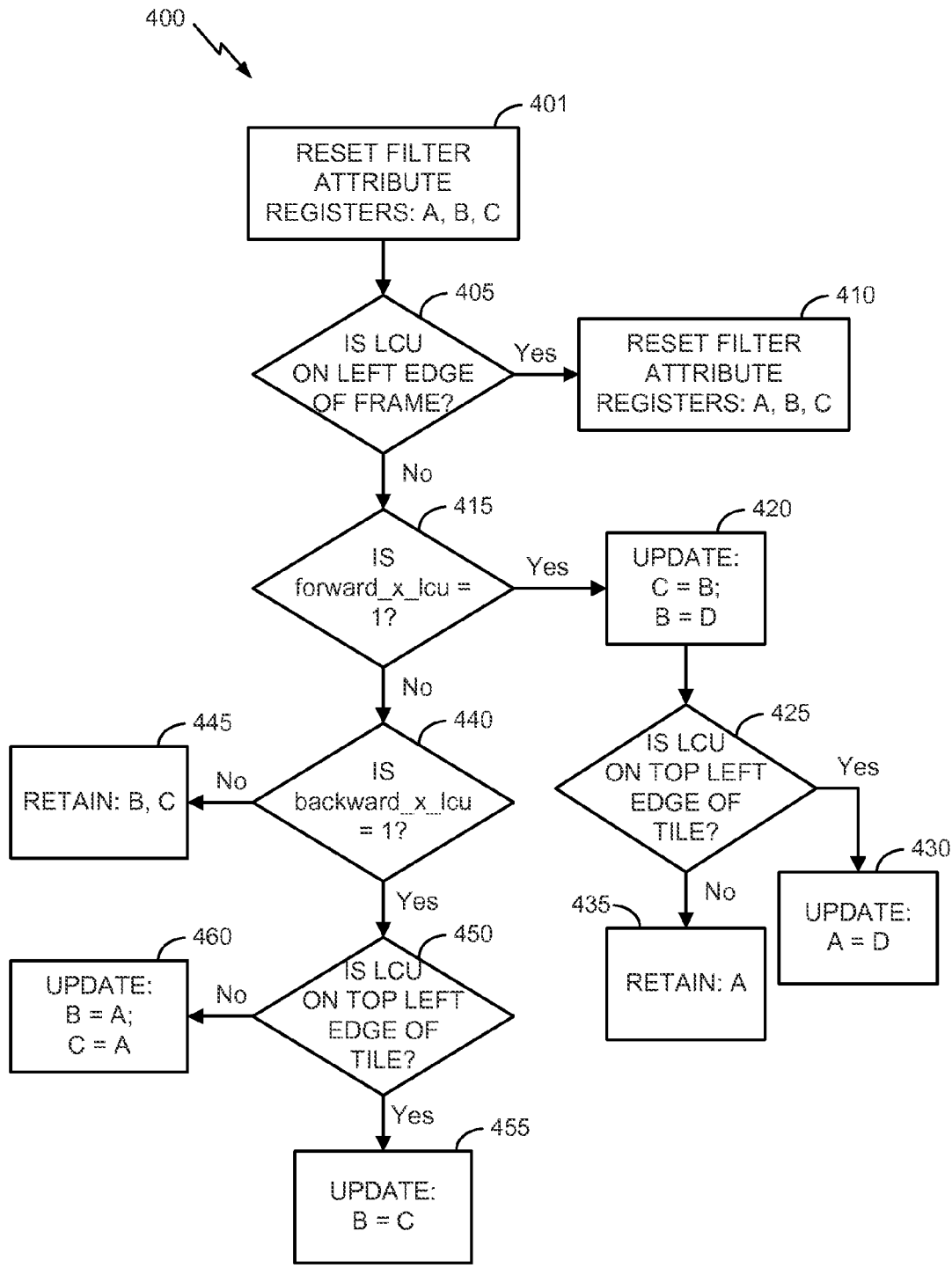
FIG. 8 is a flowchart illustrating an example of processing performed by a largest coding unit (LCU) update module in accordance with aspects described in this disclosure.

FIG. 8 is a flowchart illustrating an example of processing performed by the LCU update module in accordance with aspects described in this disclosure.

The method 400 begins at block 401 where the LCU update module 224 resets the filter attribute registers: A, B, and C. This may include setting the value of each of the filter attribute registers A, B, and C to zero. At block 405, the LCU update module 224 determines whether the current LCU is on the left edge of the current frame. When the current LCU is on the left edge of the current frame, the method proceeds to block 410, where the LCU update module 224 resets the filter attribute registers: A, B, and C.

When the current LCU is not on the left edge of the current frame, the method proceeds to block 415, where the LCU update module 224 determines whether the current LCU has moved forward in the x-direction from the previous LCU, i.e., whether the flag forward_x_lcu is equal to one. When the current LCU has moved forward in the x-direction from the previous LCU, the method proceeds to block 420 where the LCU update module 224 updates the filter attribute register C with the contents of the filter attribute register B and updates the filter attribute register B with the contents of the filter attribute register D. At block 425, the LCU update module 224 determines whether the current LCU is on the top left edge of the current tile. When the current LCU is on the top left edge of the current tile, the method proceeds to block 430, where the LCU update module 224 updates the filter attribute register A with the contents of the filter attribute register D. When the current LCU is not on the top left edge of the current tile, the method proceeds to block 435, where the LCU update module 224 retains the value of the filter attribute register A.

When the current LCU has not moved forward in the x-direction from the previous LCU, the method proceeds to block 440 where the LCU update module 224 determines whether the current LCU has moved backward in the x-direction from the previous LCU, i.e., whether the flag backward_x_lcu is equal to one. When the current LCU has not moved backward in the x-direction from the previous LCU, the method proceeds to block 445 where the LCU update module 224 retains the values of filter attribute registers B and C. When the current LCU has moved backward in the x-direction from the previous LCU, the method proceeds to block 450 where the LCU update module 224 determines whether the current LCU is on the top left edge of the current tile.

When the current LCU is on the top left edge of the current tile, the method proceeds to block 455 where the LCU update module 224 updates the filter attribute register B with the contents of the filter attribute register C. When the current LCU is not on the top left edge of the current tile, the method proceeds to block 460 where the LCU update module 224 updates the filter attribute register B with the contents of the filter attribute register A and updates the filter attribute register C with the contents of the filter attribute register A.

Figure 9:
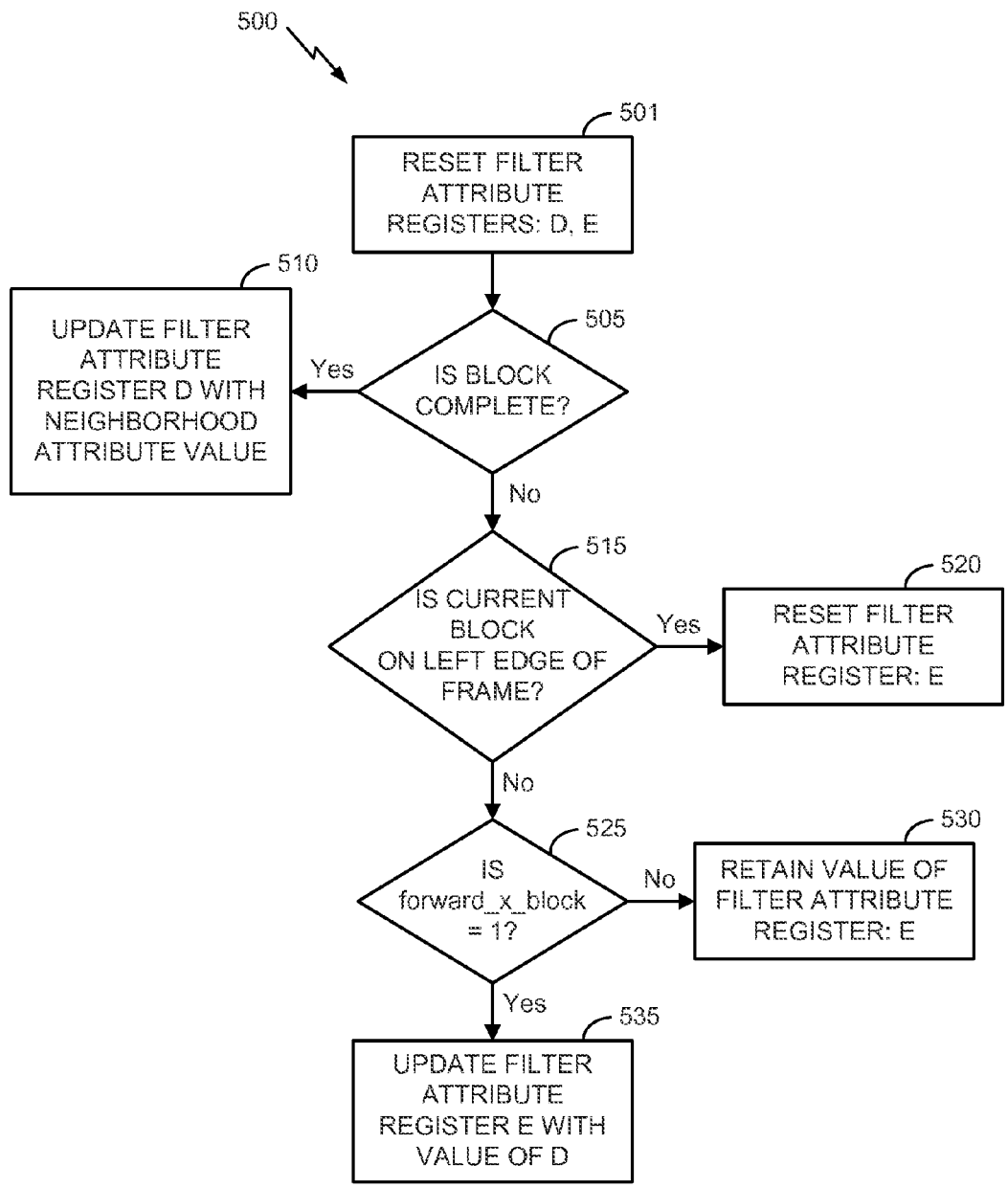
FIG. 9 is a flowchart illustrating an example of processing performed by a block update module in accordance with aspects described in this disclosure.

FIG. 9 is a flowchart illustrating an example of processing performed by a block update module in accordance with aspects described in this disclosure. The method 500 begins at block 501 where the block update module 225 resets the filter attribute registers: D and E. This may include setting the value of each of the filter attribute registers D and E to zero. At block 505, the block update module 225 determines whether processing of the current block is complete. When processing of the current block is complete, the process proceeds to block 510 where the block update module 225 updates the filter attribute register D with one or more neighborhood attribute value(s). In one implementation, the block update module 225 updates the filter attribute register D with a phase value accumulated after operation of the filter 235. The one or more neighborhood values, such as the phase value, may be received from the neighborhood calculation and update module.

When the processing of the current block is not complete, the process proceeds to block 515 where the block update module 225 determines whether the current block is on the left edge of the current frame. When the current block is on the left edge of the current frame, the process proceeds to block 520 where the block update module 225 resets the filter attribute register E. When the current block is on the left edge of the current frame, the process proceeds to block 525 where the block update module 225 determines whether the current block has moved forward in the x-direction from the previous block, i.e., whether the flag forward_x_block is equal to one.

When the current block has not moved forward in the x-direction from the previous block, the process proceeds to block 530 where the block update module 225 retains the value of the filter attribute register E. When the current block has moved forward in the x-direction from the previous block, the process proceeds to block 535 where the block update module 225 updates the filter attribute register E with the contents of the filter attribute register D.

The above methods 400 and 500 have been discussed with respect to the processing performed by the control logic 220 of FIG. 4. However, those skilled in the art will recognize that a similar processes is performed by the control logic 240. Further, for other types of video processing other than downscaling, the methods 400 and 500 may be modified depending on the walk order based attribute values used in the specific video processing method.

Example Flowchart for Determining Neighborhood Video Attribute Values

Figure 10:
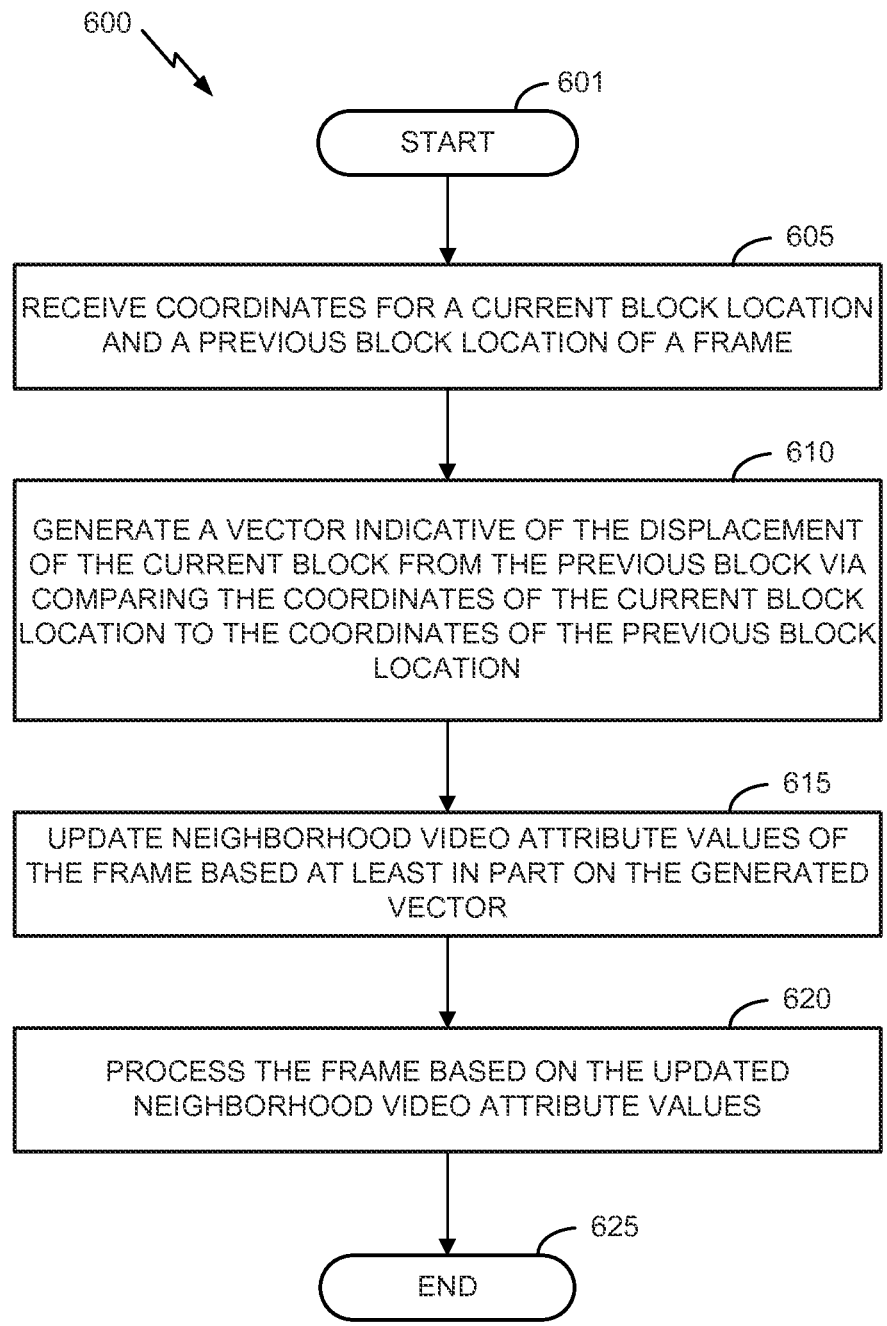
FIG. 10 is a flowchart illustrating a method for processing video data in accordance with aspects described in this disclosure.

With reference to FIG. 10, an example procedure for determining neighborhood video attribute values for a frame of video data will be described. FIG. 10 is a flowchart illustrating a method 600 for processing video data based on determined neighborhood video attribute values in accordance with aspects of the present disclosure. The steps illustrated in FIG. 10 may be performed by a video encoder (e.g., the video encoder 20), a video decoder (e.g., the video decoder 30), or component(s) thereof. For convenience, method 600 is described as performed by a video coder (also simply referred to as coder), which may be the video encoder 20 and/or the video decoder 30, or component(s) thereof, The method 600 begins at block 601. At block 605, the coder receives coordinates for a current block location and a previous block location of a frame. At block 610, the coder generates a vector indicative of the displacement of the current block from the previous block via comparing the coordinates of the current block location to the coordinates of the previous block location. At block 615, the coder updates neighborhood video attribute of the frame values based at least in part on the generated vector. At block 620, the coder processes the frame based on the updated neighborhood video attribute values. The method 600 ends at block 625.

In the method 600, one or more of the blocks shown in FIG. 10 may be removed (e.g., not performed) and/or the order in which the method is performed may be switched. In some embodiments, additional blocks may be added to the method 600. The embodiments of the present disclosure are not limited to or by the example shown in FIG. 10, and other variations may be implemented in accordance with the present disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute instructions of the program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method operable by a video coding circuit for determining neighborhood video attribute values for processing a frame of video data, the method comprising:
   receiving coordinates for a current block location and a previous block location of the frame;
   generating a vector indicative of the displacement of the current block from the previous block via comparing the coordinates of the current block location to the coordinates of the previous block location, the displacement of the current block from the previous block being indicative of a portion of a walk order from the previous block to the current block;
   updating the neighborhood video attribute values based at least in part on the generated vector; and
   processing the frame based on the updated neighborhood video attribute values.

2. The method of claim 1, wherein the processing of the frame based on the updated neighborhood video attribute values comprises downscaling the frame via filtering the frame in at least one dimension and wherein the neighborhood video attribute values comprise a phase value, an accumulator value and a residual divisor value.

3. The method of claim 1, wherein the vector is further indicative of the displacement of a current largest coding unit (LCU) from a previous LCU.

4. The method of claim 3, wherein the updating of the neighborhood video attribute values comprises: determining whether the current LCU is on a left edge of the frame and whether the current LCU is on a top left edge of a tile; and using the determination to update the neighborhood video attribute values.

5. The method of claim 3, wherein the neighborhood video attribute values comprise a current tile neighborhood video attribute value, current and previous LCU neighborhood video attribute values, and current and previous block neighborhood video attribute values.

6. The method of claim 1, wherein the updating of the neighborhood video attribute values comprises: determining whether the current block is on a left edge of the frame; and using the determination to update the neighborhood video attribute values.

7. The method of claim 3, wherein the vector comprises:
   a first flag indicative of whether the current block has been displaced in the forward x-direction; and
   a second flag indicative of whether the current block has been displaced in the forward y-direction.

8. The method of claim 3, wherein the vector comprises:
   a third flag indicative of whether the LCU has been displaced in the forward x-direction;
   a fourth flag indicative of whether the LCU has been displaced in the forward y-direction;
   a fifth flag indicative of whether the LCU has been displaced in the backward x-direction; and
   a sixth flag indicative of whether the LCU has been displaced in the backward y-direction.

9. The method of claim 1, the method being executable on a wireless communication device, wherein the device comprises:
   a memory configured to store video data;
   a processor configured to execute instructions to process the video data stored in the memory; and
   a receiver configured to wirelessly receive the video data including the coordinates for the current block location and the previous block location.

10. The method of claim 9, wherein the wireless communication device is a cellular telephone and the video data, including the coordinates for the current block location and the previous block location, is received by the receiver and modulated according to a cellular communication standard.

11. A device for determining neighborhood video attribute values for processing a frame of video data, comprising:
    a memory configured to store the video data; and
    a processor in communication with the memory and configured to:
      receive coordinates for a current block location and a previous block location of the frame;
      generate a vector indicative of the displacement of the current block from the previous block via comparing the coordinates of the current block location to the coordinates of the previous block location, the displacement of the current block from the previous block being indicative of a portion of a walk order from the previous block to the current block;
      update the neighborhood video attribute values based at least in part on the generated vector; and
      process the frame based on the updated neighborhood video attribute values.

12. The device of claim 11, wherein the processor is further configured to downscale the frame via filtering the frame in at least one dimension and wherein the neighborhood video attribute values comprise a phase value, an accumulator value and a residual divisor value.

13. The device of claim 11, wherein the vector is further indicative of the displacement of a current largest coding unit (LCU) from a previous LCU.

14. The device of claim 13, wherein the processor is further configured to: determine whether the current LCU is on a left edge of the frame and whether the current LCU is on a top left edge of a tile; and use the determination to update the neighborhood video attribute values.

15. The device of claim 13, wherein the neighborhood video attribute values comprise a current tile neighborhood video attribute value, current and previous next LCU neighborhood video attribute values, and current and previous block neighborhood video attribute values.

16. The device of claim 11, wherein the processor is further configured to: determine whether the current block is on a left edge of the frame; and use the determination to update the neighborhood video attribute values.

17. The device of claim 13, wherein the vector comprises:
a first flag indicative of whether the current block has been displaced in the forward x-direction; and
a second flag indicative of whether the current block has been displaced in the forward y-direction.

18. The device of claim 13, wherein the vector comprises:
a third flag indicative of whether the LCU has been displaced in the forward x-direction;
a fourth flag indicative of whether the LCU has been displaced in the forward y-direction;
a fifth flag indicative of whether the LCU has been displaced in the backward x-direction; and
a sixth flag indicative of whether the LCU has been displaced in the backward y-direction.

19. The device of claim 11, wherein the device is a wireless communication device, the device further comprising:
a receiver configured to wirelessly receive the video data including the coordinates for the current block location and the previous block location.

20. The device of claim 19, wherein the wireless communication device is a cellular telephone and the video data, including the coordinates for the current block location and the previous block location, is received by the receiver and modulated according to a cellular communication standard.

21. An apparatus, comprising:
means for receiving coordinates for a current block location and a previous block location of a frame of video data;
means for generating a vector indicative of the displacement of the current block from the previous block via comparing the coordinates of the current block location to the coordinates of the previous block location, the displacement of the current block from the previous block being indicative of a portion of a walk order from the previous block to the current block;
means for updating neighborhood video attribute values for processing the frame based at least in part on the generated vector; and
means for processing the frame based on the updated neighborhood video attribute values.

22. The apparatus of claim 21, wherein the means for processing of the frame based on the updated neighborhood video attribute values comprises means for downscaling the frame via filtering the frame in at least one dimension and wherein the neighborhood video attribute values comprise a phase value, an accumulator value and a residual divisor value.

23. The apparatus of claim 21, wherein the vector is further indicative of the displacement of a current largest coding unit (LCU) from a previous LCU.

24. The apparatus of claim 23, wherein the means for updating of the neighborhood video attribute values comprises: means for determining whether the current LCU is on a left edge of the frame and whether the current LCU is on a top left edge of a tile; and means for using the determination to update the neighborhood video attribute values.

25. The apparatus of claim 23, wherein the neighborhood video attribute values comprise a current tile neighborhood video attribute value, current and previous LCU neighborhood video attribute values, and current and previous block neighborhood video attribute values.

26. The apparatus of claim 21, wherein the means for updating of the neighborhood video attribute values comprises: means for determining whether the current block is on a left edge of the frame; and means for using the determination to update the neighborhood video attribute values.

27. The apparatus of claim 23, wherein the vector comprises:
a first flag indicative of whether the current block has been displaced in the forward x-direction; and
a second flag indicative of whether the current block has been displaced in the forward y-direction.

28. The apparatus of claim 23, wherein the vector comprises:
a third flag indicative of whether the LCU has been displaced in the forward x-direction;
a fourth flag indicative of whether the LCU has been displaced in the forward y-direction;
a fifth flag indicative of whether the LCU has been displaced in the backward x-direction; and
a sixth flag indicative of whether the LCU has been displaced in the backward y-direction.

29. A non-transitory computer readable storage medium having stored thereon instructions that, when executed, cause a processor of a device to:
receive coordinates for a current block location and a previous block location of the frame;
generate a vector indicative of the displacement of the current block from the previous block via comparing the coordinates of the current block location to the coordinates of the previous block location, the displacement of the current block from the previous block being indicative of a portion of a walk order from the previous block to the current block;
update the neighborhood video attribute values based at least in part on the generated vector; and
process the frame based on the updated neighborhood video attribute values.

30. The non-transitory computer readable storage medium of claim 29, wherein the vector is further indicative of the displacement of a current largest coding unit (LCU) from a previous LCU, the non-transitory computer readable storage medium further having stored thereon instructions that, when executed, cause the processor to: determine whether the current LCU is on a left edge of the frame and whether the current LCU is on a top left edge of a tile; and use the determination to update the neighborhood video attribute values.

* * * * *